F. CHENEY.
SOUND REPRODUCING MACHINE.
APPLICATION FILED OCT. 30, 1912.
1,198,416.
Patented Sept. 19, 1916.
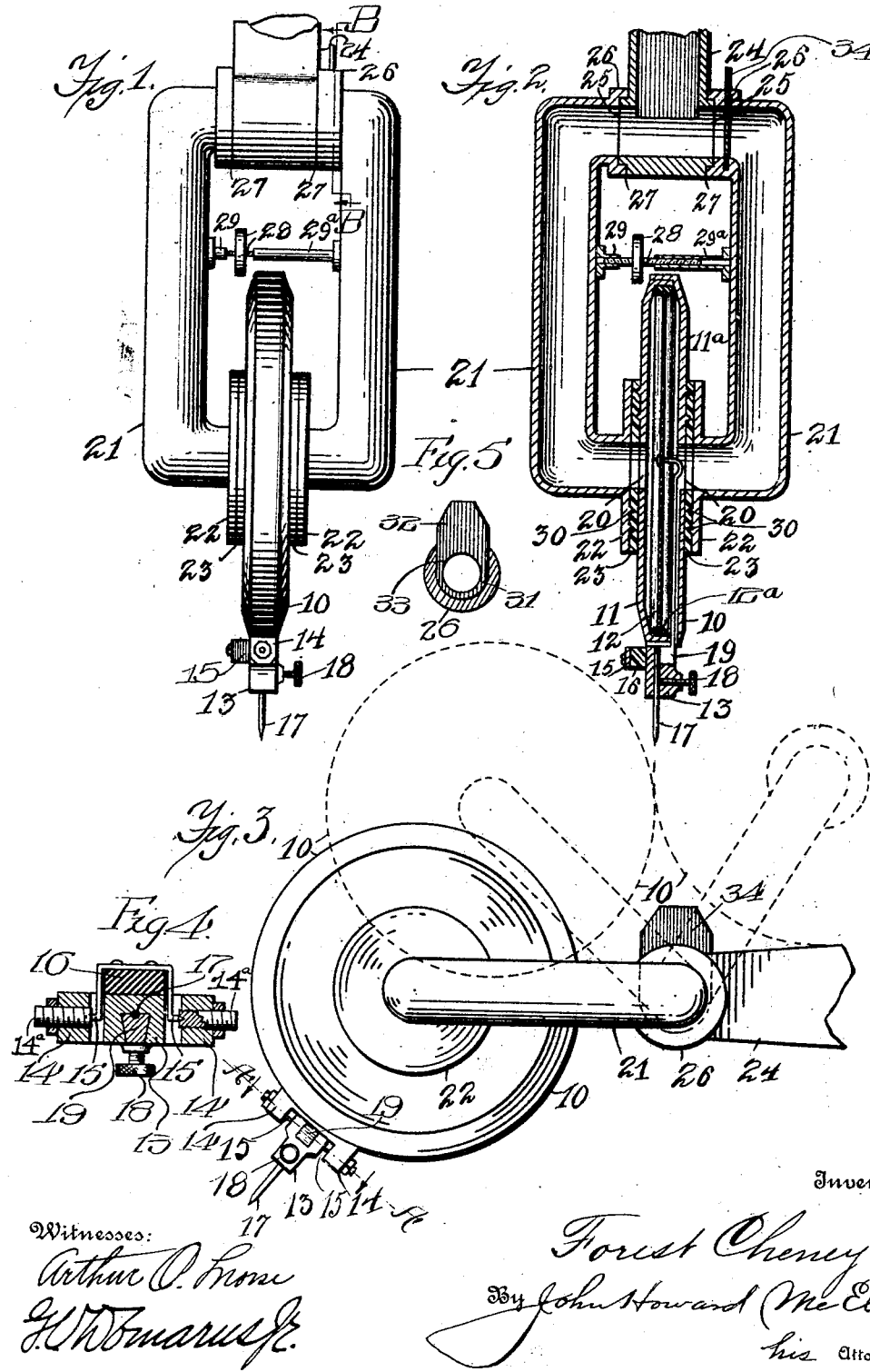

UNITED STATES PATENT OFFICE.

FOREST CHENEY, OF CHICAGO, ILLINOIS, ASSIGNOR, BY MESNE ASSIGNMENTS, TO CHENEY TALKING MACHINE COMPANY, OF CHICAGO, ILLINOIS, A CORPORATION OF ILLINOIS.

SOUND-REPRODUCING MACHINE.

1,198,416.

Specification of Letters Patent. Patented Sept. 19, 1916.

Application filed October 30, 1912. Serial No. 728,571.

*To all whom it may concern:*

Be it known that I, FOREST CHENEY, a citizen of the United States, and a resident of Chicago, in the county of Cook and State of Illinois, have invented certain new and useful Improvements in Sound-Reproducing Machines, of which the following is a full, clear, and exact specification.

My invention is concerned with certain new and useful improvements in sound reproducing machines, and more especially with the connections between the needle holder and the sound box.

My invention consists of a novel mounting of the needle holder upon the sound box so that the needle and the connecting needle arm can vibrate freely, but without the possibility of any metallic or harsh sound passing to the tone arm.

To illustrate my invention, I annex hereto a sheet of drawings, in which the same reference characters have been employed to designate identical parts in all the figures, of which,—

Figure 1 is a top plan view of the sound box and immediate connections of a sound-reproducing machine, but with the sound box turned about sixty degrees from its normal position in the supporting tubes so as to show more clearly the needle holder and its connections; Fig. 2 is a similar view, with the sound box correspondingly displaced, but in central horizontal section; Fig. 3 is a side elevation, with the sound box in its proper position; Fig. 4 is a detail in section on the line A—A of Fig. 3; and Fig. 5 is a detail in section on the line B—B of Fig. 1.

In carrying out my invention, I employ a sound box 10, which may be conveniently constructed of two shallow, cup-shaped metallic disks 11 and 11ᵃ, which disks have on their peripheries flanges of the proper size so that the disk 11ᵃ can fit snugly over the disk 11, and hold the rubber or other gasket 12ᵃ, which in turn receives the diaphragm 12 in place so that the latter extends across the center of the sound box and parallel to the inner walls thereof.

The shell 11ᵃ is provided on its periphery with a pair of lugs or ears 14, through which are screwed the adjusting screws 14ᵃ, which have recessed ends to serve as a bearing for the pointed ends of the generally U-shaped, spring-supporting member 15, which has secured thereto the needle holder 13 with the block 16 of rubber or some similar material interposed to deaden any possible vibrations of the metal. A set screw 18 is threaded through a suitable aperture in the side of the needle holder 13 and coöperates with the needle 17, which is set in the longitudinal recess extending through the needle holder 13 in the customary manner. The sound bar or needle arm 19 is rigidly secured in the needle holder, so that the vibrations of the needle are transmitted by the arm to the center of the diaphragm 12, to which center the other end of the sound bar or needle arm is connected in the customary manner.

The sound box has suitable apertures 20 formed in the center of its sides, and surrounding these apertures are the rubber or other sound-deadening annular disks 23, against the outer surfaces of which are pressed the disks 22 of the tubular arms 21 which serve to connect the sound box with the tone arm or horn 24. The inner faces of the disks 22 and the outer faces of the shells 11 and 11ᵃ of the sound box are provided with suitable prongs 30, or the surfaces otherwise roughened so that the prongs will engage the disks 23 and hold the sound box between the arms 21 so that there can be no possible rattling. The arms 21 are of a general U-shape, and the ends have annular flanges 26 which take over and fit somewhat snugly on the similar annular flanges 25 formed on the end of the tone arm 24, as best shown in Fig. 2. To draw the ends of the tubular arms 21 on the tone arm 24 and on the sound box 10, I secure on the inner sides of the arms 21 the right and left hand nuts 29 and 29ᵃ, and in these nuts are threaded the right and left hand screw 28, which is provided with a suitable intermediate disk or head by which it can be turned to tighten or loosen the pressure, as may be desired.

From the foregoing description, it will be noted that the diaphragm 12 is so connected with the tone arm or horn 24 that all the condensations and rarefactions of the air produced on both sides of the diaphragm by its vibrations have a direct passage to the tone arm, so that said condensations and rarefactions, or vibrations of the air, can be transmitted freely and utilized to the fullest extent in reproducing whatever record is being run beneath the needle 17. It will also be noted that, with the construction herein shown and described, the sound box can be swung about the joint between the arm 21 and the tone arm or horn 24 as a center, and thus the sound box can be lifted up, to change the needle or replace the record, through and into the dotted-line positions shown in Fig. 3.

As it may sometimes happen that I wish to diminish the volume of the sound reproduced, I may employ in connection with the structure heretofore described, means for closing one of the tubes 21 leading from the sound box to the tone arm; and a convenient structure for this purpose is to enlarge one of the flanges 26 and cut therein a groove 31, and when both sides of the diaphragm are to be used, this groove 31 is filled by the plate 32, shown in Fig. 5, which has therein a circular aperture 33 of the same diameter as the internal diameter of the tubes 21, so that when said plate is shoved into place, there is no material obstruction of the passage. When, however, it is desired to shut off one side and reduce the volume thereby substantially one-half, I take out the plate 32 having the aperture 33, and substitute therefor a similar plate 34, shown in Fig. 2, which plate, however, lacks the aperture 33, so that its insertion in the groove completely shuts off that side of the passage leading to the sound box.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

In a sound-reproducing machine, the combination with a sound box, of a diaphragm mounted therein, a needle holder, a needle arm connecting the holder to the diaphragm, ears supported from the sound box, set screws mounted in the ears, a U-shaped spring support for the needle holder pivoted in the ends of the set screws, and a block of damping material interposed between the spring support and the needle holder.

In witness whereof, I have hereunto set my hand and affixed my seal, this 25th day of October, A. D. 1912.

FOREST CHENEY. [L. S.]

Witnesses:
JOHN HOWARD MCELROY,
MILDRED ELSNER.